(12) United States Patent
Burghouts (10) Patent No.: US 9,959,485 B2
(45) Date of Patent: May 1, 2018

(54) IMAGE PATTERN RECOGNITION SYSTEM AND METHOD

(71) Applicant: Nederlandse Organisatie voor toegepast-natuurwetenschappelijk onderzoek TNO, 's-Gravenhage (NL)

(72) Inventor: Gerardus Johannes Burghouts, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days. days.

(21) Appl. No.: 14/653,778

(22) PCT Filed: Dec. 20, 2013

(86) PCT No.: PCT/NL2013/050942
§ 371 (c)(1),
(2) Date: Jun. 18, 2015

(87) PCT Pub. No.: WO2014/098604
PCT Pub. Date: Jun. 26, 2014

(65) Prior Publication Data
US 2015/0356376 A1 Dec. 10, 2015

(30) Foreign Application Priority Data
Dec. 21, 2012 (EP) .................... 12199174

(51) Int. Cl.
*G06K 9/00* (2006.01)
*G06K 9/62* (2006.01)
*G06K 9/46* (2006.01)

(52) U.S. Cl.
CPC ........ *G06K 9/6256* (2013.01); *G06K 9/00711* (2013.01); *G06K 9/4642* (2013.01); *G06K 9/6255* (2013.01)

(58) Field of Classification Search
None
See application file for complete search history.

(56) References Cited

PUBLICATIONS

Bonissone P et al.; "A fuzzy random forest", International Journal of Approximate Reasoning, Elsevier Science. New York, NY. us. vol. 51. No. 7. Sep. 1, 2010, pp. 729-747.*

(Continued)

*Primary Examiner* — Fred Hu
(74) *Attorney, Agent, or Firm* — Banner & Witcoff, Ltd.

(57) ABSTRACT

An image pattern recognition method detects a pattern in a sequence of video images or individual images from detected interest points. Feature vectors are extracted with video data from video regions around the interest points. A forest of decision trees is used to compute a set of bin values in histograms with bins corresponding to leaf nodes of the decision trees. Each bin value is a sum of contributions computed for individual interest points. Non-binary decision functions are used to compute the contributions and node dependent scale values are used to compute the arguments of the non-binary decision functions. The node dependent scale values may be computed from standard deviations of feature values found for the nodes, multiplied by a factor that is common to the nodes. This factor may be adjusted by feedback so that it can be set differently for different detection classes.

13 Claims, 6 Drawing Sheets

(56) References Cited

PUBLICATIONS

Bonissone P et al: "A fuzzy random forest", International Journal of Approximate Reasoning. Elsevier Science. New York. NY. us. vol. 51. No. 7. Sep. 1, 2010, pp. 729-747.

Quinlan et al: "Probabilistic decision trees", Jan. 1, 1990 (Jan. 1, 1990). Machine Learning : An Artificial Intelligence Approach—Part 3 [Presented a Sample of Machine Learning Research Representative of the Period Between 1986 and 1989] Based on Papers and Proceedings of Various Conferences Held Between 1986 and 1989].

Frank Moosman et al: "Fast Discriminative Visual Codebooks using Randomized Clustering Forests", Annual Conference on Neural Information Processing Systems, Dec. 4, 2006.

Theodoridis, Koutroumbas: "Pattern Recognition", 2008, Academic Press, p. 215-221, 261-263, p. 221 and sect.5.2.2.

Murthy S K: "Automatic Construction of Decision Trees From Data: A Multi-Disciplinary Survey", Journal of Data Mining and Knowledge Discovery, Norwell, MA, US, vol. 2. No. 4. Jan. 1, 1998, pp. 345-389.

Riwal Lefort et al: "Weakly Supervised Classification of Objects in Images Using Soft Random Forests", Sep. 5, 2010, Computer Vision A ECCV 2010, Springer Berlin Heidelberg, Berlin, Heidelberg, pp. 185-198.

International Search Report and Written Opinion—PCT/NL2013/050942—dated Mar. 7, 2014.

A. Agarwal, B. Triggs, "Multilevel image coding with hyperfeatures," International Journal on Computer Vision, 2008.

D. Batra, R. Sukthankar, T. Chen, "Learning class-specific affinities for image labelling," International Conference on Computer Vision and Pattern Recognition, 2008.

A. Bosch, A. Zisserman, X. Munoz, "Scene classification using a hybrid generative/discriminative approach," IEEE Transactions on Pattern Analysis and Machine Intelligence, 2008.

L. Breiman, "Random forests," Machine Learning, 2001.

G.J. Burghouts, K. Schutte, "Correlations between 48 human actions improve their detection," International Conference on Pattern Recognition, 2012.

G.J. Burghouts, K. Schutte, H. Bouma, R.J.M. den Hollander, "Selection of Negative Samples and Two-Stage Combination ofMultiple Features for Action Detection in Thousands of Videos," Machine Vision and Applications, submitted, 2012.

C.-C. Chang, C.-J. Lin, "LIBSVM: a library for support vector machines," http://www.csie.ntu.edu.tw/~cjlin/libsvm, 2001.

S. Sadanand, J. J. Corso, "Action bank: A high-level representation of activity in video," International Conference on Computer Vision and Pattern Recognition, 2012.

J.C. van Gernert, C.J. Veenman, A.W.M. Smeulders, J.M. Geusebroek, "Visual Word Ambiguity," IEEE Transactions on Pattern Analysis and Machine Intelligence, 2011.

L. Gorelick, M. Blank, E. Shechtmanm, M. Irani, R. Basri, "Actions as Space-Time Shapes," IEEE Transactions on Pattern Analysis and Machine Intelligence, 2012.

T. Guha, R.K. Ward, "Learning Sparse Representations for Human Action Recognition," IEEE Transactions on Pattern Analysis and Machine Intelligence, 2012.

A. Gupta, P. Srinivasan, J. Shi, L. S. Davis, "Understanding Videos, Constructing Plots: Learning a Visually Grounded Storyline Model from Annotated Videos," International Conference on Computer Vision and Pattern Recognition, 2009.

P. Hanckmann, K. Schutte, G.J. Burghouts, "Automated Textual Descriptions for a Wide Range of Video Events with 48 Human Actions," International Workshop on Video Event Categorization, Tagging and Retrieval, 2012.

Y.-G. Jiang, C.-W. Ngo, J. Yang, "Towards optimal bag-of-features for object categorization and semantic video retrieval," International Conference on Image and Video Retrieval, 2007.

F. Jurie, B. Triggs, "Creating efficient codebooks for visual recognition," International Conference on Computer Vision, 2005.

I. Laptev, "On Space-Time Interest Points," International Journal of Computer Vision, 2005.

I. Laptev, M. Marszalek, C. Schmid, B. Rozenfeld, "Learning Realistic Human Actions from Movies," International Conference on Computer Vision and Pattern Recognition, 2008.

S. Lazebnik, C. Schmid, and J. Ponce, "Beyond bags of features: Spatial pyramid matching for recognizing natural scene categories," International Conference on Computer Vision and Pattern Recognition, 2006.

J. Liu, J. Luo, M. Shah, "Recognizing Realistic Actions from Videos 'in the Wild'," International Conference on Computer Vision and Pattern Recognition, 2009.

J. Philbin, 0. Chum, M. Isard, J. Sivic, A. Zisserman, "Lost in quantization: Improving particular object retrieval in large scale image databases," International Conference on Computer Vision and Pattern Recognition, 2008.

K.E.A. van de Sande, T. Gevers, C.G.M. Snoek, "Evaluating Color Descriptors for Object and Scene Recognition," IEEE Transactions on Pattern Analysis and Machine Intelligence, 2010.

C. Schuldt, I. Laptev, B. Caputo, "Recognizing Human Actions: A Local SVM Approach," International Conference on Pattern Recognition, 2004.

J. Sivic, A. Zisserman, "Video Google: A Text Retrieval Approach to Object Matching in Videos," International Conference on Computer Vision, 2003.

T. Tuytelaars, C. Schmid, "Vector quantizing feature space with a regular lattice," International Conference on Computer Vision, 2007.

H. Wang, M. M. Ullah, A. Klaser, I. Laptev, C. Schmid, "Evaluation of local spatia-temporal features for action recognition," British Machine Vision Conference, 2009.

J. Zhang, M. Marszalek, S. Lazebnik, C. Schmid, "Local features and kernels for classification of texture and object categories: A comprehensive study," International Journal of Computer Vision, 2007.

Moosmann, Frank, Bill Triggs, and Frederic Jurie. "Fast discriminative visual codebooks using randomized clustering forests." Twentieth Annual Conference on Neural Information Processing Systems (NIPS'06). MIT Press, 2007.

Perronnin, Florent. "Universal and adapted vocabularies for generic visual categorization." Pattern Analysis and Machine Intelligence, IEEE Transactions on 30.7 (2008): 1243-1256.

\* cited by examiner

IMAGE PATTERN RECOGNITION SYSTEM AND METHOD

CROSS-REFERENCE TO RELATED APPLICATIONS

This application is a U.S. National Stage application under 35 U.S.C. § 371 of International Application PCT/NL2013/050942 (published as WO 2014/098604 A1), filed Dec. 20, 2013, which claims priority to Application EP 12199174.9, filed Dec. 21, 2012. Benefit of the filing date of each of these prior applications is hereby claimed. Each of these prior applications is hereby incorporated by reference in its entirety.

FIELD OF THE INVENTION

The invention relates to an image pattern recognition system and method.

BACKGROUND

It is known to perform pattern detection based on detection of spatio-temporal interest points in a segment of video data. In the known pattern recognition method, a classifier computes a detection result by comparing histograms of the interest points with reference histograms and assigning a classification of the closest reference histograms. A known support vector machine may be used as classifier for example. For this purpose, the histograms of the interest points are computed by assigning the interest points to histogram bins dependent on feature vectors of the interest points.

Spatio-temporal interest points and feature vectors are defined as follows. A segment of video data corresponds to a succession of images, wherein the position of images in the succession represents temporal position and positions within image represent spatial positions. A spatio-temporal interest point corresponds to coordinates comprising a spatial position r and temporal position t of a time and position where image content changes as a function of position within an image and/or as a function of position in the succession of images. The coordinates may be used to define a region in the segment of video data relative to the interest point, the region consisting of a set of pixel positions with predetermined coordinate offsets to the coordinates of the interest point, e.g. a spatio-temporal block wherein the coordinate offset of each spatio-temporal coordinate is in a predetermined range for that coordinate.

The content of the images in such spatio-temporal regions relative to the detected interest points can be used to extract feature vectors, which may take the form of histograms of pixel values or pixel value gradients in the spatio-temporal regions.

The assignment of interest points to histogram bins (also called quantisation) can be performed with the aid of a decision tree with leaves that correspond to respective ones of quantisation bins and nodes that correspond to decision criteria to be applied to feature vectors to select between different branches from the node.

The decision criterion at each node defines a threshold value for a selected feature value such as the value of a selected component of the feature vector or more generally a selected function of the components of the feature vector. Each detected interest point is assigned to one of the quantization bins, after selecting a path through the tree by applying the decision criteria of the nodes along the path to the feature vector of the detected interest point.

More generally, a "decision forest" may be used, comprising a plurality of decision trees that each correspond to a different set of quantisation bins at the leaves of the tree, to assign an interest point to quantisation bins in each of these sets. An article titled "Fast Discriminative Visual Codebooks using Randomized clustering forests" by Moosman et all in the Annual conference on Neural Information Processing Systems 2006 (EPO reference XP055056764) describes creation of Random forests.

In the known method, at least the decision criteria and the reference histograms are selected using a training process, using segments of training video data. Methods to do so are known per se. The training process for the decision criteria involves selection among possible types of feature values and possible thresholds for each node.

It is also known to use soft decision trees. The basics of decision trees, including soft decision trees are described by Koutoumbras in Pattern recognition (2008) pages 215-221 and pages 261-263 (EPO reference XP002693953). A soft decision tree uses non-binary decision functions, to assign non-binary decision values to nodes in the tree. Soft decision trees have the advantage that small errors in feature values cannot lead to strongly different decision results. Koutoumbras describes the use of a standard soft decision function applied to normalized feature data Quinlan et al describe probabilistic decision trees in Machine learning: an artificial intelligence approach part 3 sections 5.1 and 5.8 (EPO reference XP008160784).

The use of soft decision trees in decision forests is described by Bonissone et al. in an article published in the International Journal of Approximate Reasoning, Vol. 51 pages 729-747 (EPO reference XP027142367). Lefort et al describe use of soft random forests in an article titled "Weakly supervised classification of objects in soft random forests in Computer vision at the ECCV 2010 pages 185-198 (EPO reference XP019150735).

For real video segments pattern recognition by the classifier always involves errors in terms of false positive and false negative detections. It is desirable to reduce such errors.

SUMMARY

It is an object to reduce the number of errors for a pattern recognition method of the above mentioned type without requiring major modifications of the training and detection process.

An image pattern recognition system according to claim 1 is provided. Herein a non-leaf node of the decision trees is associated with a number referred to as a scale value. Contributions to input for the classifier are computed in proportion to results of applying a soft decision function (also called a "non-binary decision function herein because its function result is not limited to a binary value range) to a ratio of the scale value and a difference between a threshold and a feature value. It has been found that this makes it possible to reduce detection errors in the case of video pattern recognition, but this way of computing contributions to histogram-like input for a classifier like a support vector machine can be used for pattern recognition from single images also.

Although an improvement can be obtained already when a scale value and a non-binary decision function is used for one non-leave node, a greater improvement can be realized if respective scale values and non-binary decision functions are used for a plurality of the non-leaf nodes. Herein the same non-binary decision function may be used for all those nodes, but alternatively different non-binary decision functions may be used. Preferably, respective scale values are used for substantially all nodes, that is, all nodes, or all nodes except root nodes, or all nodes except no more than five percent of the nodes.

Scale values for use in the computation of the contributions are computed by determining a measure of statistical spread of the feature values used as argument of the bon-binary decision function for respective leave nodes and setting scale values for these leave nodes each to a product its standard deviation and a common factor that is common to a plurality of leave nodes. It has been found that this reduces detection errors without requiring large numbers of additional training video sequences. The standard deviation may be used as a measure of statistical spread for example.

In an embodiment the processing system is configured to select the common factor in a feedback loop using the pattern detection results obtained from training examples, using respective different values of the common factor. It has been found that minimal errors are obtained for different types of actions by using different values of the common factor. By using feedback adjustment the value of the common factor can be adapted to different detection classes, so that detection errors can be reduced. For each different detection class the relative scale values may be set using the same measure of spread. This reduces the effort needed to train detectors for different classes.

BRIEF DESCRIPTION OF THE DRAWING

These and other objects and advantageous aspects will become apparent from a description of exemplary embodiments using the following figures.

DETAILED DESCRIPTION OF EXEMPLARY EMBODIMENTS

Figure 1:
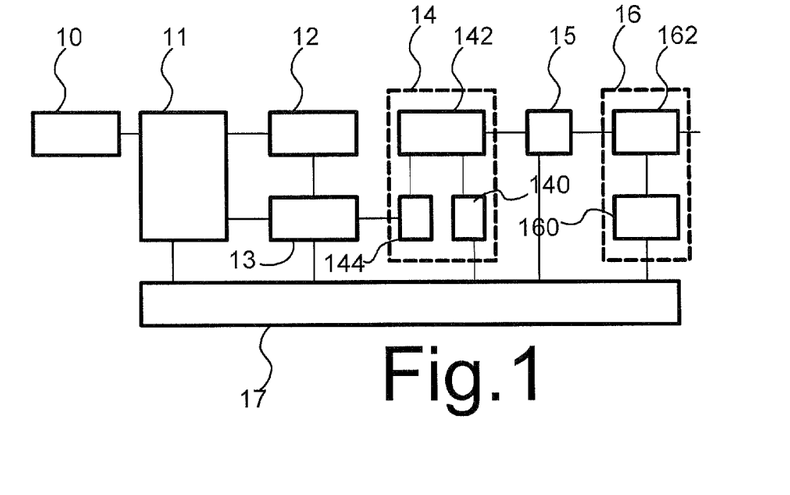
FIG. 1 shows a pattern detection system

FIG. 1 shows a pattern detection system. The system comprises a camera 10, a video data storage device 11, an interest point detector 12, a feature vector extractor 13, a bin value computing module 14, a bin value data memory 15, a support vector machine 16 and a control system 17. Camera 10 has an output coupled to video data storage device 11. Interest point detector 12 has an input coupled to video data storage device 11. Feature vector extractor 13 has inputs coupled to video data storage device 11 and an output of interest point detector 12. Bin value computing module 14 has an input coupled to an output of feature vector extractor 13. Bin value computing module 14 has an output coupled to bin value data memory 15. Support vector machine 16 has an input coupled to bin value data memory 15. Control system 17 is coupled to video data storage device 11, interest point detector 12, a feature vector extractor 13, bin value computing module 14, bin value data memory 15 and support vector machine 16. Bin value computing module 14 comprises a first memory 140 for storing decision criteria, a second memory 144 for storing detected feature vectors from feature vector extractor 13 and a decision module 142 coupled to the memory 140. In an embodiment, the first and second memory may be different parts of a same memory. Decision module 142 is configured to apply decision criteria from memory 140 to feature vectors from feature vector extractor 13.

Support vector machine 16 comprises a reference bin value memory 160, and a comparator module 162 coupled to reference bin value memory 160. Comparator module 162 is configured to compare sets of bin values from bin value data memory 15 with reference sets of bin values from reference bin value memory 160. In a support vector machine 16 a measure of difference between the set of bin values and a reference set is computed for each reference set, a weighted sum of the measures of difference for different reference sets is computed, and a decision function is applied to this weighted sum, for example by assigning one of two binary values representing the classification result dependent on whether the weighted sum is above or below a threshold. Herein the weights used in the sum, which may be positive or negative, represent whether the reference sets correspond to the pattern to be detected or not. However, it should be appreciated that other types of classifier may be used, not only classifiers that produce one of two binary values (pattern detected or not respectively), but also classifiers that distinguish between a plurality of different pattern types, and classifiers that do not use weighted sums. In another example, the classifier may simply use a classification provided with the reference set that differs least from the set of bin values obtained from the sequence of images, or a majority vote using votes for classifications provided with a predetermined number of reference set that differs least from the set of bin values obtained from the sequence.

Although various components of the pattern detection system are shown as separate entities, it should be understood that, except for camera 10, they can be implemented using a programmable data processing system with storage devices such as semi-conductor memory and disk memory, using a computer program to make the data processing system execute the functions of part or all of the entities.

Figure 1A:
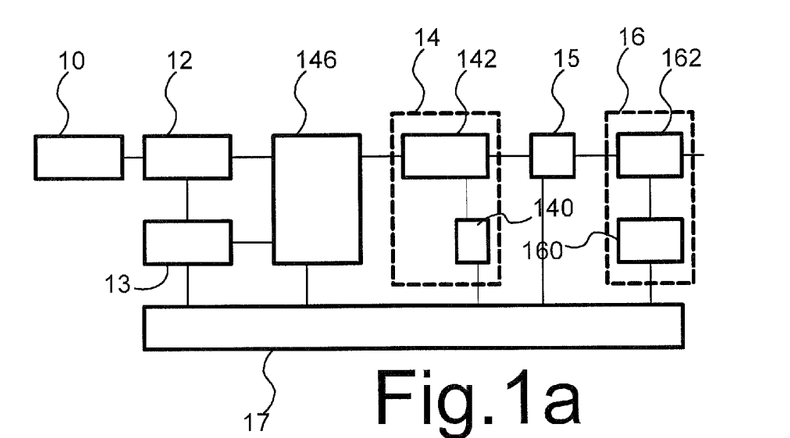
FIG. 1a shows a pattern detection system

FIG. 1a shows a pattern detection system wherein interest point detector 12, a feature vector extractor 13 received images from camera 10 and extracted feature vectors for detected interest points are stored in a feature vector memory 146 for use by bin value computing module 14. In this embodiment the video data itself need not be stored.

Figure 2:
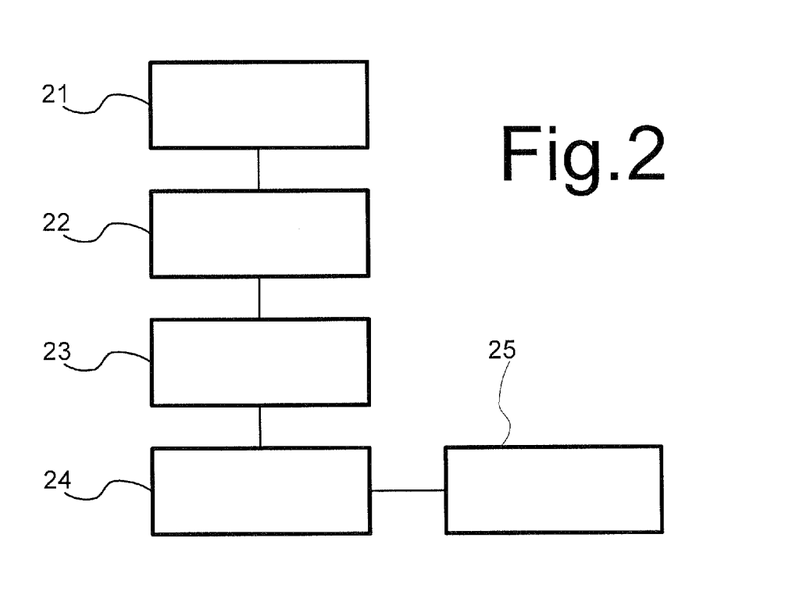
FIG. 2 shows a flow chart of video pattern detection

FIG. 2 shows a flow-chart of operation of the pattern detection system during video pattern detection. In a first step 21, camera 10 captures a images of a video sequence and stores video data representing the images in video data storage device 11. In a second step 22, interest point detector 12 detects spatio-temporal interest points in a segment of the video data. This results in a set of spatio-temporal coordinates (r,t) of the detected interest points, that is, an indication of the position of the detected interest point in the segment and its position in image coordinates.

In a third step 23 feature vector extractor 13 accesses video data storage device 11 to extract feature data from the sequence using image areas from a subset of the images. The subset of images contains images at successive positions in the sequence at a time point determined from the temporal coordinate of the detected interest point and the image areas lying in these images spatial locations in the images determined from the spatial coordinates of the detected interest point. In an embodiment feature vector extractor 13 computes a histogram of gradient values in the time and/or space direction of the pixel values in the image areas from a subset of the images. Such a histogram has bins that are each associated with a respective range of gradient values, each bin containing a count of the number of pixels that have gradient values in the ranges of the bin. In this case, different components of the feature vector may be the counts from different bins. But in an embodiment other components of the feature vector may be other functions of the pixel values in spatio-temporal regions, such as averages, amplitudes of Fourier transforms of pixel values etc.

More generally, a feature vector may be any collection of vector components, each component corresponding to a number that represents data derived from the image areas from a subset of the images. Feature vectors with more than hundred components may be used for example. Feature vector extractor 13 uses coordinates of detected interest points from interest point detector 12 to select the image areas from a subset of the images. Feature vector extractor 13 stores the resulting feature vectors in the second memory 142 of bin value computing module 14.

In a fourth step 24, bin value computing module 14 uses each feature vector to increment bin data in bin value data memory 15. To do so, bin value computing module 14 makes use of the concept of decision trees.

Figure 3:
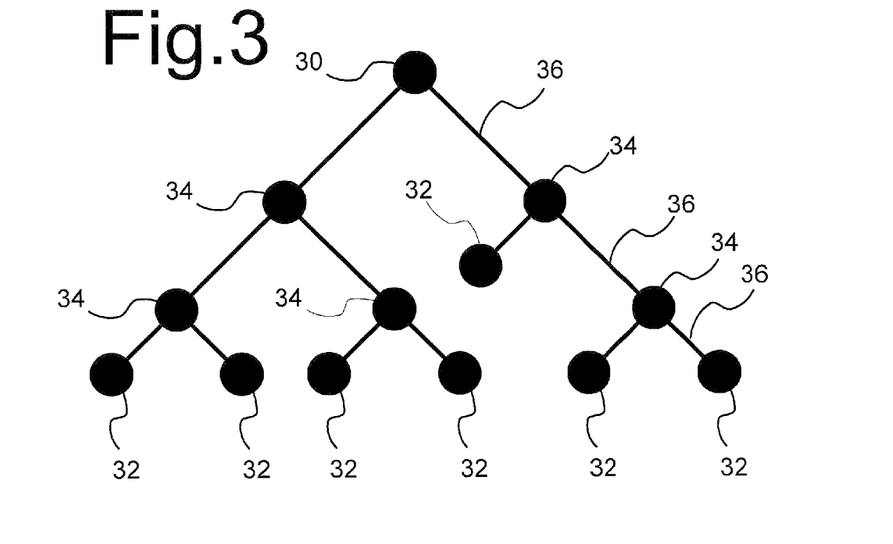
FIG. 3 shows a decision tree

FIG. 3 illustrates a decision tree. The tree has a root note 30, leaf nodes 32, layers of intermediate nodes 34 and branches 36 (only branches along the path from root node 30 to one leaf node 32 labelled) connecting the nodes. A first and second branch 36 connect root node 30 to intermediate nodes 34 in a next layer and further branches connect intermediate nodes 34 in each layer to further intermediate nodes or to leaf nodes 32 in a next layer. Leaf nodes 32 correspond to bins in bin value data memory 15. As may be noted, not all leaf nodes need be in the same layer. Conventionally, the decision tree is used to select one histogram bin (leaf node 32) at the end of a path through the tree.

The selection of this conventional path involves decision criteria associated with the nodes. Conventionally, each of intermediate nodes 34 and root node 20 (node N) may be associated with a pair of branches 36 to successor nodes (N1, N2) as well as with a respective criterion in the form of a combination (m, T) of a number m that indicates a feature vector component and a threshold T. Conventionally, the respective criteria of each of the intermediate nodes 34 and root node 30 are used to test whether value of the indicated component in the feature vector is above the threshold or not, and to use the result to select between proceeding to a next node along a first or second branch from the intermediate nodes 34 and root node 30 to a successor node N1 or a node N2.

Conventionally, a "forest" with a plurality of such decision trees may be used. Each decision tree corresponds to a respective subset of bins, each decision tree being used to select one bin from its respective subset of bins that is to be incremented.

In the system of FIG. 1, soft decision trees are used, wherein each of the intermediate nodes 34 and root node 30 corresponds to a respective soft decision criterion corresponding to a combination (m, T, S, G1, G2) of a number m that indicates a feature vector component, a threshold T, a scale S and soft decision functions G1, G2 associated with the branches from the node, with G2=1−G1. The feature vector component may be a selected function of other feature vector components. As used herein, any such function will be considered to be another component of the feature vector.

As will be explained, the soft decision functions will be used to compute factors F=G1(x) and G2(x), where the argument x of the soft decision function G1 is x=(V−T)/S, V being a feature vector value. In an embodiment, the basic decision functions G1, G2 are the same for all nodes, for example functions know as sigmoid function may be used, $G1=1/(1+\exp(-x))$ and $G2=1/(1+\exp(x))$, wherein $\exp(\ )$ is the exponential function, raising "e" to the power of its argument.

Figure 4:
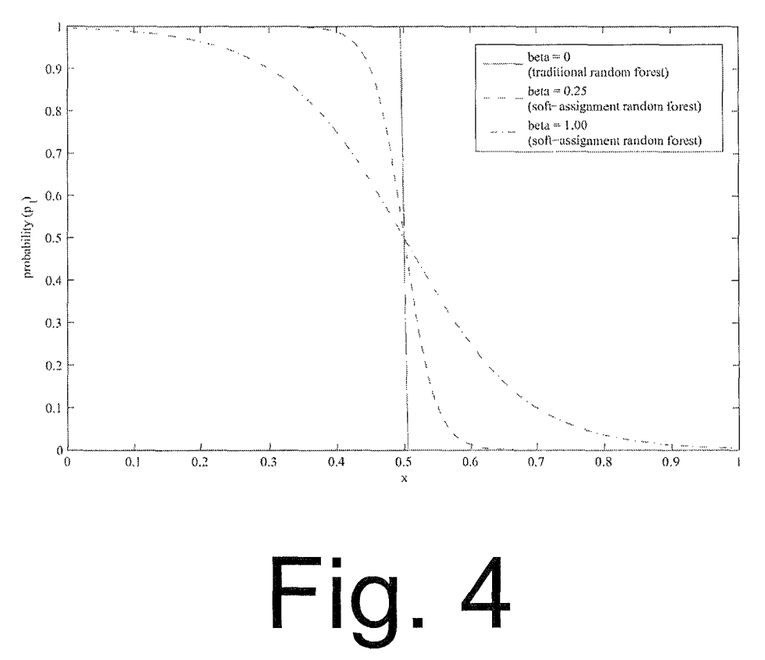
FIG. 4 shows a graph of a decision function

FIG. 4 shows a graph of a decision function $G1=1/(1+\exp(-x))$ as a function of its argument.

In a fourth step 24 of the flow chart of FIG. 2, bin value computing module 14 computes bin value increments using the soft decision criteria. Bin value computing module 14 computes the increment C(l) for a leaf node l 32 as a product of factors F(b) associated with the branches b 36 along the path of from the root node 30 to the leaf node l 32.

$$C(l)=\text{Product}(b)$$

The factor F(b) for each branch b 36 is computed as a function $F=G1((V(m)-T)/S)$ or $F=G2((V(m)-T)/S)$, using (m, T, S, G1, G2) of the node from which the branch takes off, using the value V(m) of the mth component of the feature vector of function of the feature vector components and the one of G1 and G2 that is associated with the branch. In an embodiment bin value computing module 14 computes bin value increments from a same feature vector for each of the bins (leaf nodes 32) in this way. When a forest of decision trees is used, bin value computing module 14 may use each decision tree to compute increments for all bins of respective subset of bins for that decision tree. Still in fourth step 24, bin value computing module 14 increments bin values in bin value data memory 15 with the increments computed for the different bins.

In a fifth step 25, support vector machine 16 compares the resulting sets of bin values for the different bins with reference sets of bin values from reference bin value memory 160. For each reference sets of bin values a similarity measure with the set of bin values for the video segment can be computed (e.g. a sum of the lowest of the bin value for the video segment and the lowest of bin values from the reference set for corresponding bins), which may be combined to compute a recognition score. Methods of doing so are known per se.

In an embodiment support vector machine 16 determines, for each set of reference bin values and each bin, the lowest of the bin value from bin value data memory 15 and bin values from the reference set from bin value reference bin value memory 160. For each set of reference bin values support vector machine 16 sums these lowest values over all bins and reference sets, optionally multiplying the values for different reference sets with set-specific weights. Positive and negative weights may be used, so that similarity to reference sets with positive weights reinforces recognition and similarity to reference sets with negative weights works against recognition. Support vector machine 16 applies a predetermined decision function to the sum after adding a bias value, to produce recognition score.

In an embodiment the bin values from bin value data memory 15 and bin value reference bin value memory 160 may be normalized prior to comparison (e.g. prior to determining the lowest values), for example by dividing the bin values in bin value data memory 15 or the increments by the total number of detected interest points, or by the sum of the bin values taken over all bins in bin value data memory 15. However, alternatively other ways of computing similarity scores between sets of bin value data memory 15 and the reference sets of bin value reference bin value memory 160 may be used, based on correlations for example.

The recognition score may be used for various purposes. For example, control system 17 may compare the recognition score with a threshold value and generate an alert signal if the recognition score exceeds the threshold. In another embodiment, control system 17 may retrieve and display the video segment from which the interest points where detected, when the recognition score exceeds the threshold. The pattern detection system may be a surveillance system for example, wherein the alert and/or the display is used for enabling a human supervisor to view the video segment. In another embodiment the pattern detection system may part of a video search system, with a user interface for entering a query that may directly or indirectly specify the threshold, the video segment or a reference to it being returned as a search result when the recognition score exceeds the threshold.

As will be noted, operation of the pattern detection system depends on a number of parameters. These include the depths of the leaf nodes 32 in the decision trees (i.e. the number of branches between the root node 30 and the leaf node 32), the combinations (m, T, S) that are associated with respective nodes, the sets of reference bin values and their associated bias value. The selection of these parameters is made by means of a training process, using sets of training video segments for with positive and negative examples of the pattern to be detected respectively.

Figure 6:
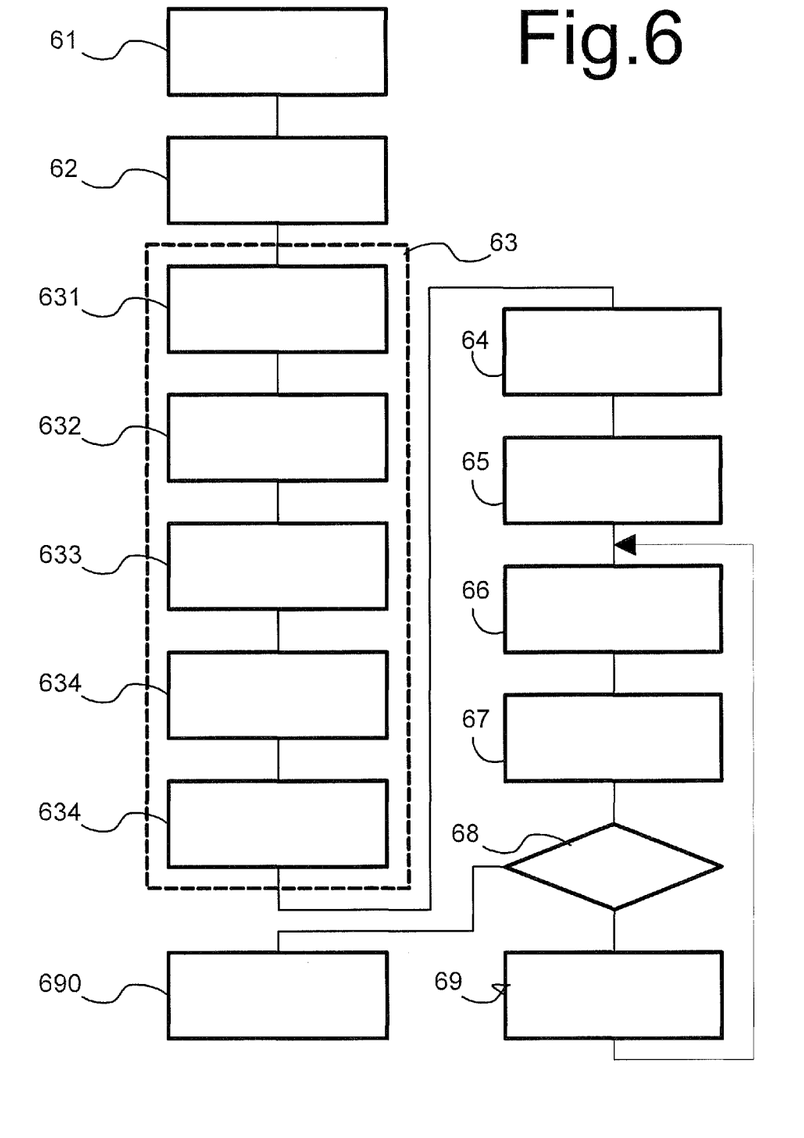
FIG. 6 shows a flow chart of a training process

FIG. 6 shows a flow chart of a training process. In a first step 61 a training set of a plurality of video segments is stored in video data storage device 11 and each is provided with a classification that indicates whether or not the video segment is an example of the class to be detected. In a second step 62 control system 17 causes interest point detector 12 and feature vector extractor 13 to detect interest points and extract feature vectors for the detected interest points for all the video segments in the training set. Control system 17 collects the extracted feature vectors and stores them in association with the classification whether or not the video segment from which the feature vector was extracted is an example of the class to be detected.

In third and fourth steps 63, 64 control system 17 selects the parameters of the decision trees. In an embodiment, this is done node for node. In a third step 63, control system 17 selects index values m and threshold values T for the nodes.

Figure 5:
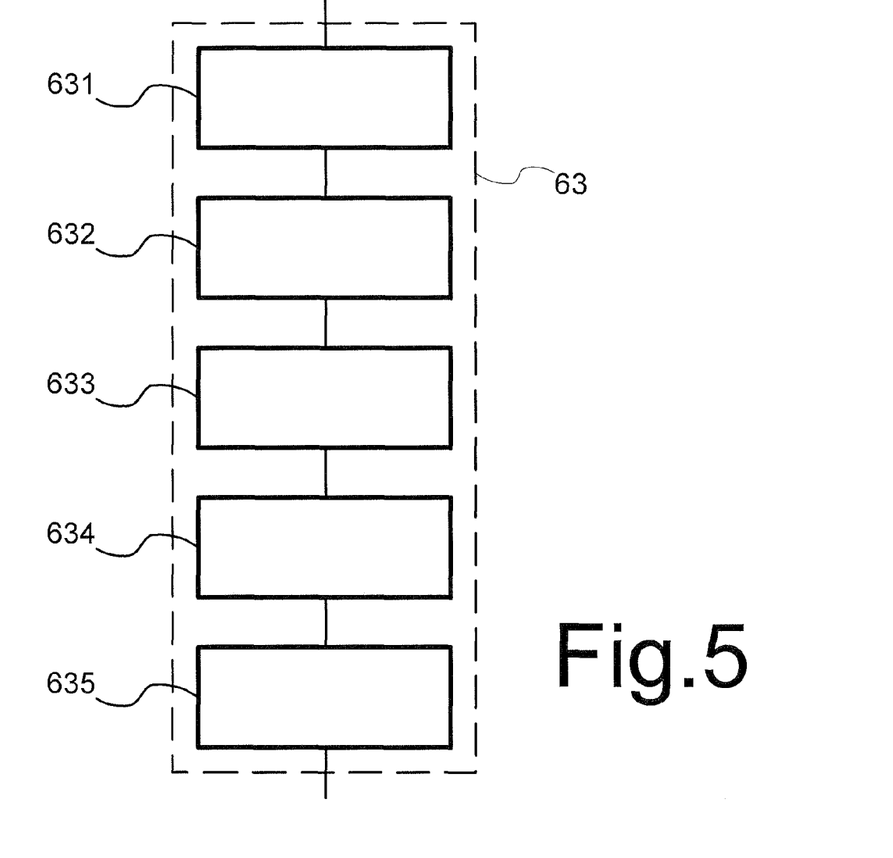
FIG. 5 shows a flow chart of decision tree selection

Selection of index values m and threshold values T for the nodes is well known per se. A random forest selection algorithm may be used, which is known per se. FIG. 5 shows an illustrative embodiment of forest selection third step 63 has a first sub-step 631 wherein control system 17 selects sets of proposed indexes m of feature values for the root nodes of the trees in the forest, that is, a set of indexes of components of feature vectors. A random selection of a predetermined number of indexes may be used, wherein the predetermined number is substantially smaller than the total number of components of the feature vector. In one example the feature vector has 162 components and the predetermined number is 32. In a second sub-step 632, control system 17 selects sets of proposed threshold values for the root nodes. The proposed threshold values may be selected at random. A plurality of threshold values T may be selected for each index.

In a third sub-step 633, control system 17 evaluates different combinations of the proposed indexes m and thresholds T. In an embodiment each combination (m, T) of selected indexes and threshold values T is evaluated by computing a separation score from a subset of the training examples, using a predetermined function for that score. The separation score function measures how well the criterion defined by a combination (m, T) operates to separate positive and negative training samples. A Gini index may be used for example. Control system 17 selects a combination with the best separation score function value for use in the criterion of the root node.

The separation score function may be computed by counting the number Npu, of detected interest points in training video segments of the class to be detected for which the feature value m is above the threshold, as well as the overall number Np, of detected interest points in training video segments of the class to be detected. Similar numbers Nnu and Nn may be computed for detected interest points in training video segments of example where the class should not be detected. From these numbers control system 17 may compute separation score function values for the (m, T) combinations, dependent on how much interest points form training videos of the class to be detected are still mixed with those outside that class in the sets of interest points with feature values above and below the threshold. An optimal separation score occurs when Npu=Np and Nnu=0 and when Npu=0 and Nn=Nnu, with lesser optimal scores with increasing deviations from these conditions.

In a fourth sub-step 634 control system 17 proceeds to selection of combinations (m, T) of selected indexes m and threshold values T for subsequent nodes at the end of branches from previous nodes, to make such subsequent nodes intermediate nodes 34. Alternatively, control system 17 may determine that control system 17 determines that a subsequent node becomes a leaf node 32. This may be done for example when control system 17 determines that the split made in a training set of feature vectors, by applying the criteria of preceding nodes along the path from the root node 30 to the subsequent node to the feature vectors, results in a homogeneous subset of feature vectors, i.e. a subset from feature vectors with the same training classification, or less than a predetermined fraction of other training classification. If the subsequent node is not to be a leaf node, a combination (m, T) may be selected as describe for root node 30. The process may stop once all branches end in leaf nodes or when a predetermined number of nodes has been generated for example.

In a fifth sub-step 635, control system 17 loads the selected index values m, threshold values T and scale values S for the nodes into the first memory 140 for storing decision criteria of bin value computing module 14. In a fourth step 64, control system 17 selects relative scale factors S0 for the nodes. In embodiment, this is done for each node by taking the feature values for the selected index m of the node from the extracted feature vectors of all detected interest points in all video segments in the training set and computing the standard deviation of these feature values:

$$S0 = \mathrm{sqrt}\{<V(m)*V(m)> - <V(m)>*<V(m)>\}$$

Herein < > indicates taking the average over all detected interest points in all video segments. Instead of the standard deviation another measure of statistical spread may be used, such as an average $<|V(m)-<V(m)>|>$ of the absolute value of the deviation from the average, a distance between argument values at which a cumulative count function reaches predetermined values (the cumulative count function Cm(x) is a function that represents the fraction of features in the training set with values for feature value m below the argument x, predetermined values may be 0.5+d and 0.5−d, where d is a predetermined number) or a distance between V(m) values at which a histogram of the frequency of values V(m) drops below a predetermined threshold etc.

In a fifth step 65 control system 17 selects an initial common scale factor B for the scale factors S, from which the value of the scale S (also called the scale value S) for a node may be determined by $$S = B * S0$$

Herein S0 is the relative scale factor for the node. In an embodiment the process optimizes the common scale factor B by means of feedback, as will be explained. Hence the initial value of the common scale factor B is not critical.

In a sixth step 66, control system 17 loads the resulting scale values S for the nodes into the first memory 140 for storing decision criteria of bin value computing module 14. Control system 17 then causes bin value computing module 14 to compute bin values for all video segments in the training set. Control system 17 collects the extracted sets of bin values for all video segments in the training set and stores the collected set of bin values for each video segment in association with the classification whether or not the video segment from which the set of bin values was extracted is an example of the class to be detected.

In a seventh step 67 control system 17 selects the sets of reference bin values and corresponding bias values for use by support vector machine 16 based on the collected sets of bin values and the classifications. Methods of doing this may be used that are known per se and will therefore not be described in detail. In sixth step 66 control system 17 furthermore computes a score for recognition quality obtained by means of the selected parameters on the basis of detection results when applied to video segments with a classification that indicates whether or not the video segment is an example of the class to be detected. In an embodiment, further sets of such video segments are used. A score is used that decreases with decreasing numbers of false positive and false negative pattern recognitions results.

In an eighth step 68 control system 17 determines whether a termination criterion is met. The termination criterion may be that scores of recognition quality for a predetermined number of values of the common scale factor B have been computed. If the termination criterion is not met, control system 17 proceeds to a ninth step 69, wherein it selects a different value of the common scale factor B and repeats from sixth step 66. Control system 17 may select successive values from a set of equally spaced values of the common scale factor B for example. Or it may select values obtain based on the computed scores of recognition quality, for example by selecting a common scale factor B at an optimum of an interpolation of the score for recognition quality obtained with previous values of the common scale factor B. With such adaptive selection the termination criterion may be that the change obtained with a different common scale factor B is below a threshold.

Figure 7:
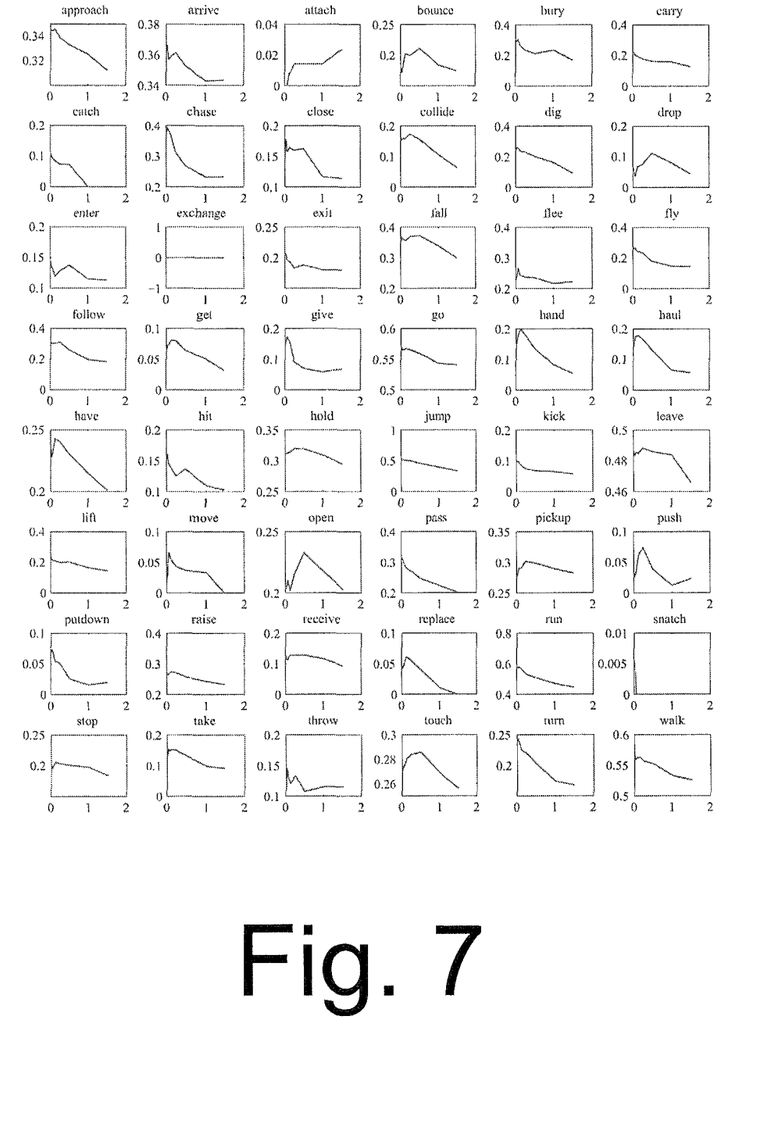

FIG. 7 illustrates values of a score for recognition quality that were obtained for different values of the common scale factor B for different video segments that show different classes of action. As can be seen different values of the common scale factor B are optimal for different classes of action. Therefore, it is advantageous to search for an optimal value of the common scale factor B for each given type of action individually.

When the termination criterion has been determined to be met, control system 17 proceeds to a tenth step 690, wherein it selects a value of the common scale factor B that results in the best score for recognition quality. One of the values selected in fifth or ninth step 65, 69 may be used, or a value of the common scale factor B may be selected that optimizes an interpolation of the score for recognition quality obtained with those values. In the latter embodiment, selects the sets of reference bin values and corresponding bias values for use by support vector machine 16 in combination with the selected value of the common scale factor B as described for sixth and seventh step.

Furthermore in tenth step 690 control system 17 causes the resulting scale values S for the nodes obtained with that common scale factor into the first memory 140 for storing decision criteria of bin value computing module 14.

Furthermore, control system 17 loads the sets of reference bin values and corresponding bias values that were obtained for the selected value of the common scale factor B into reference bin value memory 160 of support vector machine 16. The pattern detection system is then used for pattern detection using the loaded parameters as described in relation to FIG. 2.

Although a specific embodiment has been described, it should be appreciated that various aspects of this embodiment can be modified. For example, although the embodiment has a random forest with trees wherein all non-final nodes are associated with a scale value S, it should be appreciated that part of the nodes need not have an associated scale value S. Such nodes may be handled in the conventional way, by selecting one branch for a feature vector and suppressing increments C to all successor nodes of the node along the unselected branch. Thus, a leaf node may lie at the end of a path that contains zero, one, two or more nodes with associated scale values S. The increment for the leaf node is proportional to the result of the decision function G1 or G2 of each such node, that is, to a product of the results of the decision function G1 or G2 of the nodes.

In an embodiment, a scale value S is associated with a node in fourth step 64 of the training step only if the standard deviation exceeds a predetermined threshold. In other embodiments random decisions may be used to decide whether or not a scale value S will be associated with a node in fourth step 64. Although an embodiment has been described wherein the increments are computed by means of a product, it should be understood that this embodiment also stands for implementation by summing contributions from the nodes along a path. The logarithm of a product of factors is equal to the sum of logarithms of the factors. Similarly, application of the increments to the bin values may be performed by addition or by multiplication.

It should be understood that the terms "(decision) tree" and "histogram" are used to refer to sets of functional information. The term tree refers to information about leaf nodes and non-leaf nodes. The information for a non-leaf node includes information representing a feature vector component selection, a threshold, a scale factor, and a pair of successor nodes. When the non-binary decision functions for different nodes can differ, the information for the non-leaf node may also include an indication of the functions to be used. The information for a leaf node includes information representing a bin to which increments should be added. A bin corresponds to a storage location, where a bin value is stored. A "histogram" is a set of bins. The information for the tree is used to control the feature vector component, the threshold and the scale factor that will be used to compute function values from feature vectors extracted from a video data segment and to control the bins whose contents will be updated using the function results.

Although an embodiment has been described with a support vector machine that uses a specific computation to compare sets of bin values and use them to compute a recognition result, it should be appreciated that other types of computation of the recognition result are possible. Any similarity measure may be used to compare sets of bin values.

Although an embodiment has been described wherein a recognition result for patterns of a single class is computed, recognition results may also be computed for a plurality of classes. Support vector machine 16 may provide for detection of a plurality of different classes of action, a plurality of reference sets of bin values being provided for each class of action. In this embodiment support vector machine 16 may compute respective recognition scores for each class of action from the same video segment.

Although an example has been described wherein the standard deviations are computed from a difference between an average square and a square of averages, it should be understood that any measure of value spread can be used as an indication of the standard deviation. As used herein, computation of the standard deviation is used to refer to computation of any measure of spread. The average of the absolute value of the difference with the average may be used for example. The use of the common factor B makes a specific selection uncritical. Contributions from different training video segments to the standard deviation may be weighted differently.

Although an example has been described wherein any training set may be used to determine the standard deviations of the feature component values, it should be understood that instead specifically selected training sets may be used, or that Although an example has been described wherein any training set may be used to determine the standard deviations of the feature component values, it should be understood that instead specifically selected training sets may be used, or that contributions from different training video segments to the standard deviation may be weighted differently.

Although an embodiment has been described wherein a random forest algorithm is used to generate the initial trees and their feature vector component selections m and threshold T, it should be appreciated that other methods of selecting trees may be used, for example methods that seek for more optimized trees.

Although an embodiment has been described for spatio-temporal interest points from a sequence of video images, it should be understood that the described techniques can also be applied to interest points from a single image. However, use for spatio-temporal interest points from a sequence of video images has been found to improve detection of actions of specific types in the sequence.

Background and more detailed embodiments will be discussed in the following, wherein {names} in accolades refer to the reference at the end.

The bag-of-features model is a distinctive and robust approach to detect human actions in videos. The discriminative power of this model relies heavily on the quantization of the video features into visual words. The quantization determines how well the visual words describe the human action. Random forests have proven to efficiently transform the features into distinctive visual words. A major disadvantage of the random forest is that it makes binary decisions on the feature values, and thus not taking into account uncertainties of the values. We propose a soft-assignment random forest, which is a generalization of the random forest, by substitution of the binary decisions inside the tree nodes by a sigmoid function. The slope of the sigmoid models the degree of uncertainty about a feature's value. The results demonstrate that the soft-assignment random forest improves significantly the action detection accuracy compared to the original random forest. The human actions that are hard to detect—because they involve interactions with or manipulations of some (typically small) item—are structurally improved. Most prominent improvements are reported for a person handing, throwing, dropping, hauling, taking, closing or opening some item.

For action detection, promising results have been achieved in constrained settings, such as where the number of actions was limited {Guha}, or the variations of the actions was constrained {Schuldt}, or the background was fixed {Gorelick}. The key components of a robust action detection system are: invariance of the features to changing recording conditions, sensitivity to the motion patterns and appearance, selectivity and robustness of the feature representation for the current action, and good discrimination between the positives and negatives by a robust classifier. Advanced and well-engineered action detectors have been proposed recently. The representation of a person's trajectory has enabled storyline generation {Gupta} and textual descriptions {Hanckmann}. Most recently, the Action Bank detector {Corso} has been able to learn new actions based on a rich bank of many other actions under various viewpoints and scales. Yet, simple bag-of-features models {SivicBOF}, from which also action detectors have been build {Guha, Laptev2008}, have demonstrated to be also very effective {BurghoutsICPR, WangEVAL}. Their advantage is the straightforward implementation, computational efficiency and robustness. Robustness is critical, because videos in many cases are unconstrained. For example, videos from camera networks, YouTube, and surveillance systems can by recorded in any place, and with any sort of content: what happens in front of the camera is not controllable. Bag-of-features detectors proved to be effective for detection of human actions from "videos in the wild" {Liu} and from movies {Laptev2008}. Good results have been obtained for a range of actions including quite complex action such as digging in the ground, falling onto the ground, and chasing somebody {BurghoutsICPR}. Yet, for the detection of more complex actions, such as the exchange of an item, or burying or hauling something, the standard bag-of-features action detectors did not suffice {BurghoutsICPR}.

In this paper, we consider an extension to the standard bag-of-features action detector. The bag-of-features detector transforms features into visual words and represents the video as a frequency count of the words. This representation is fed into a classifier that performs the detection task. To capture the motion patterns of human actions, STIP features {LaptevSTIP} proved to be very effective. They were found to be superior to alternative local features {WangEVAL} and also to bounding-box based features {BurghoutsMVA}. The transformation of features into a visual word representation is done by either a codebook of representatives/prototypes of the features {SivicBOF} or by a quantizer such as a random forest {Moosmann}. The random forest proved to more distinctive for the detection of actions {BurghoutsICPR}, so this is our quantizer of choice in this paper. One prominent advantage of the random forest is that during its construction—the learning phase—the class labels (whether the action is present or absent) are considered {Breiman, BurghoutsICPR, Moosmann}. This is beneficial for the discriminative power compared to other quantizers such as k-means {Bosch, Lazebnik}. The representation of the human action, in our case a histogram of visual words that is constructed by the random forest, is crucial for good discriminative power of the action detector. In this paper, we improve on the action representation, by generalizing the random forest to enable soft-assignment, leading to an increase of the detection accuracy.

The random forest assigns the features to discrete random words {Moosmann} by binary decisions on the feature values {Breiman}. These binary decisions on feature values are not natural: the feature values encode motion characteristics which have a continuous nature. The binary decision on continuous feature values is unnatural. The second disadvantage of the binary decisions is that uncertainty is not accounted for. To solve these issues, we propose to adapt the random forest by substituting the binary decision (i.e. a step function) by a sigmoid (i.e. a smooth function). In the original random forest, a feature can go either left or right at each node descending to the leafs. To rephrase this in a probabilistic manner: the probability of the feature descending to the left child, p_l, is either zero or one, p_l={0,1}. In the case of p_l=0, the probability of the feature descending to the right leaf is p_r=1−p_l=1. In our proposal, opposed to a binary decision in the original random forest, the soft-assignment random forest assigns a continuous probability when descending to the left and right node, p_l, p_r={0,1} where p_l+p_r=1. The probability of a feature descending to the left child node, p_l is determined by a sigmoid that will be defined in Section 3.1. The parameter of the sigmoid is the slope, which defines the amount of uncertainty about the feature's value: a steep slope implies high certainty whereas a slower slope implies more uncertainty. The original random forest is the special case for sigmoids with an infinite slope (i.e. the step function). The slope of the nodes' sigmoids needs to be optimized, as it has a significant impact on the discriminative power of the obtained action histograms, as we will show in the experiments. Our proposal—substituting the binary decision at the random forest's nodes by a sigmoid function—is a generalization of the random forest that enables soft-assignment.

The paper is organized as follows. In Section 2, we discuss the related work on the assignment of features to visual words, with special attention to soft-assignment. In Section 3, we define our generalization of the random forest to include soft-assignment. Section 4 shows the improved accuracy of the detection of 48 human actions in realistic videos. We summarize the most important findings. Section 5 concludes the paper.

Related Work

Visual Words

The automated extraction of visual words for the bag-of-features model is an intensive field of research {Bosch, BurghoutsICPR, BurghoutsMVA, Laptev2008, Lazebnik, Moosmann, WangEVAL, SivicBOF}, because a better mapping from the visual features to words directly improves the discriminative power of the model. Various methods have been proposed to derive the visual words. One of the most popular methods is to cluster the features, e.g. by the very efficient k-means {Bosch, Lazebnik, SivicBOF}, Gaussian mixtures {Jurie}, or fixed radius clustering {Gemert}. The cluster centers are the visual words and a nearest-neighbor mapping is used to assign the feature to a word. The disadvantage of these clustering methods is that they are unsupervised: the class labels are not considered during training. Class-specific visual words have been considered by deriving the words per class {Perronnin}. Random forests have been considered to directly optimize the separability between the class and the negatives, as the class labels are taken into account during its construction {Breiman, Moosmann}. Due to its good performance for action detection {BurghoutsICPR, BurghoutsMVA}, the random forest is our choice for deriving the visual words in this paper.

Uncertainty Modeling

The assignment of a feature to a single visual word assumes that there is a single word that describes the feature. In our case we deal with features of the continuous motion field. It is well possible that a single word does not capture the richness of the motion feature. Solutions to this incongruence have been proposed in literature by assigning a feature to multiple words that are in the vicinity {Jiang, Tuytelaars}. Probabilistic assignment to multiple words has been addressed by voting schemes {Agarwal, Batra, Perronnin, Philbin}. The method of Gemert et al. {Gernert} achieved systematic improvements on various visual classification tasks by parameterizing the spread of a feature over the visual words in a continuous kernel-density framework {kerneldensity}. They placed a Gaussian kernel on each visual word, substituting the discrete membership function by a continuous function. This model enables a continuous contribution of any feature to any word, depending on its closeness to each word. The closeness is a continuous measure defined by the Gaussian function and its scale parameter. The larger scales enable more spread of the features over the words. The scale parameter directly addresses the uncertainty of the assignment of features to words. The scale parameter is optimized for the classification task by means of cross-validation. We adapt this approach to the random forest, for which the modeling of uncertainty—by assignment of a single feature to multiple visual words—has been impossible to date. We substitute the binary decision function at each node in the original random forest by a continuous sigmoid function, enabling the spread of a feature to multiple visual words depending on its closeness.

Soft-Assignment Random-Forest

Sigmoid Tree Nodes

In the original random forest, at each node a binary decision is made on whether a feature descends to the left or right child node. This decision on a feature's value x_i is modeled by the function b(x_i,mu_i), where mu_i is the threshold value:

$$b(x\_i,mu\_i)=1 \text{ if } i\_i<mu\_i \text{ and } 0 \text{ otherwise.}$$

The value of the binary decision function determines the probability of a feature descending to the left, p_l. If the feature value x_i is smaller (greater or equal) than mu_i, then b(x_i,mu_i)=1, and the feature descends to the left (right) child node.

We substitute the binary decision function b(x_i,mu_i) by a sigmoid function f(x_i,mu_i,alpha_i):

$$1-1./(1+\exp(-(xs-m)*\log(3)./(beta*sigma)))$$

$$f(x\_i,mu\_i,alpha\_i)=1-\operatorname{frac}\{1\}\{1+\exp(-\operatorname{frac}\{x\_i-mu\_i\}\{alpha\_i\})\},$$

with the parameter alpha_i indicating the uncertainty. A large value of alpha_i causes a low slope and thereby modeling a larger degree of uncertainty. For alpha_i=0, a step function is obtained (i.e. infinite slope). For alpha_i=infinity, we obtain f(x_i,mu_i,alpha_i)=0.5 (zero slope).

In our soft-assignment random forest, the sigmoid function f(x_i,mu_i,alpha_i) is implemented at each node of each tree. For alpha_i=0, the original random forest with binary decisions at each node is obtained. In that case, the feature descends either entirely to the left (p_l=f(x_i,mu_i,alpha_i)=1) or to the right child node (p_r=1−f(x_i,mu_i,alpha_i)

=1). For alpha_i>0, the assignment is divided between the left node, p_l=f(x_i,mu_i,alpha_i)=[0,1], and right child node, p_r=1−f(x_i,mu_i,alpha_i). In the case of alpha_i=infinity, the feature descends equally to both the left and right child nodes, p_l=(f(x_i,mu_i,alpha_i)=p_r=1−p_l=1−f(x_i,mu_i,alpha_i)=0.5.

Efficient Parameter Optimization

The sigmoid function f(x_i,mu_i,alpha_i) has a slope parameter alpha_i and it is optimized for the action detection task by means of cross-validation (see Section 4). It is costly to optimize alpha_i at each node individually, or even per tree it is likely to become an intractable optimization (we will consider 10 trees, while for some other applications 500 trees are grown). We propose to optimize alpha_i for the complete forest. In order to search for the right value of alpha_i in the appropriate range of values x_i, we adapt it at each node to the range of feature values x_i on which the decision is made. This is done by establishing the standard deviation of x_i, sigma_i, first. Then the alpha_i parameter is expressed as a function of sigma_i, alpha_i=beta*sigma_i/log(3), with beta the new global uncertainty parameter that is to be optimized. In other words, beta is generic for all features i at all nodes of all trees inside the forest. We can now optimize beta globally, without having to optimize the uncertainty parameter (i.e. the sigmoid's slope) at each individual node for each feature i. The scaling of alpha_i=beta*sigma_i/log(3) is chosen such that for beta=1, the point at x_i=mu_i+sigma_i gives f(x_i)=¼, for all features i. This reference point makes it easier to understand the meaning of the sigmoid for a particular value for beta that is obtained after optimization.

Substitution of the equations gives a new definition of the sigmoid function f(x_i,mu_i,sigma_i,beta):

1−1./(1+exp(−(xs−m)*log(3)./(beta*sigma)))

f(x_i,mu_i,sigma_i,beta)=1−[1+exp(−(x_i−mu_i)*/log(3)beta*sigma_i], where beta is the single global parameter that is to be optimized, as the selection of the feature i and the threshold value mu_i are provided by the random forest generator, e.g. Breiman and Cutler's implementation {Breiman}, and sigma_i is derived directly from the data x_i.

FIG. 4 illustrates the sigmoid function f(x,mu,sigma,beta) for increasing values of beta and fixed values of mu=0.5 and sigma=0.1, and x=[0,1]. On the horizontal axis are the feature values, x, and on the vertical axis the value of f(x,mu,sigma,beta), i.e. the probability p_l that a particular value of the feature descends to the left child node (where the probability of descending to the right node is defined by p_r=1−p_l. The original random forest with binary decisions is obtained for beta=0. For this setting, there is no uncertainty on the feature's value. The soft-assignment random forest is obtained for beta>0. For larger values of beta, more uncertainty of the feature's value is modeled.

Action Detection Results

Experimental Setup

As a large video database of many diverse and complex human actions, we consider the visint.org database {visint}. It contains 3,480 movies of 48 human actions in highly varying settings. The variations are: scenes, recording conditions, viewpoints (yet static cameras), persons, and clothing. Each video has been annotated for all 48 actions, where the annotator indicated presence or absence of the action. On average, 7 actions have been indicated to be present in a video. We perform experiments on the detection of each of the 48 actions. For completeness, we mention that the video size is 1280×720 pixels and the duration ranges from 3 to 30 seconds at 30 fps.

For each action, we repeat the experiment 5 times, where each repetition uses a randomized train set (50%) and test set (50%). We report the performance on the test set, where we indicate the average of our performance measure. Our performance measure is Matthews Correlation Coefficient (MCC), because it is independent of the prevalence of an action. The prevalence of the actions varies highly: 'move' occurs in 75.4% of the movies, where 'bury' occurs only in 1.8% of the movies. The meaning of the MCC is as follows: a score of 1 (−1) indicates perfect positive (negative) correlation between the action detector and the annotations, where a score of 0 indicates no correlation with the annotations.

The detection performance of the action detectors with the original random forest (beta=0) is compared against the detectors with the soft-assignment random forest (beta>0). The sigmoid inside the random forest is the only varied parameter in the algorithm pipeline (see Section 4.2), beta={0, 1/16, ⅛, ¼, ½, 1, 3/2}. For all variations of the sigmoid's slope, we consider the exact same randomization for each of the 5 repetitions of the retrieval experiment.

Algorithmic Pipeline from Features to Detection

For each action, we create a random forest {Breiman} with 10 trees and 32 leafs, based on 200K feature vectors, 100K from randomly selected positive videos, and 100K from either randomly selected or selective sampled negative videos. The random forest quantizes the features into histograms {Moosmann} and a SVM classifier with a $chi^2$ kernel {Zhang} is trained that serves as a detector for each action. For the random forest we use Breiman and Cutler's implementation {Breiman}, with the M-parameter equal to the total number of features (162). The sigmoid functions at each node are included after the random forest has been generated. For the SVM we use the libSVM implementation {libSVM}, where the $chi^2$ kernel is normalized by the mean distance across the full training set {Zhang}, with the SVM's slack parameter default C=1. The weight of the positive class (i.e. the samples of a particular action) is set to (#pos+#neg)/#neg and the weight of the negative class (i.e. samples that do not contain the action) to (#pos+#neg)/#pos, where #pos and #neg are the amount of positive and negative class samples {Sande}.

Organization of the Results

FIG. 7 shows action detection results for all 48 actions. The varied parameter on the x-axis is the uncertainty of the soft assignment by the random forest (the beta parameter). The y-axis indicates the MCC score (detection accuracy). The score of the original random forest, without uncertainty modeling (beta=0), is on the left in each plot. For 36 out of 48 actions the detection is improved by the proposed soft-assignment random forest that models the uncertainty (beta>0). Often the best value for the uncertainty parameter beta is small For each of the 48 human actions, we plot the detection performance for decreasing slope of the sigmoid (i.e. increasing uncertainty) inside the random forest, see FIG. 7. The x-axis shows the decreasing slope of the sigmoid, beta. The most left point in each graph is the original random forest (beta=0), without uncertainty modeling (i.e. a sigmoid with infinite slope, thus a step function). The other points indicate the performance of the soft assignment random forest (beta>0). Points that are more to the right in the graph indicate larger uncertainties (i.e. lower slope). On the y-axis the MCC score is indicated as a measure of the detection accuracy for each action and each beta value of the soft-assignment.

Findings

The first finding from FIG. 7 is that 36 out of 48 human actions are improved by considering soft-assignment. The most notable improvements are achieved for actions that are hard to detect as they involve subtle interactions with small items: hand (0.20, was 0.14), drop (0.11, was 0.07), haul (0.18, was 0.14), throw (0.14, was 0.11), take (0.16, was 0.12), flee (0.27, was 0.23), close (0.18, was 0.14), dig (0.26, was 0.23), bounce (0.21, was 0.18), open (0.23, was 0.20), and, pickup (0.30, was 0.27). This result is important, as these are exactly the interesting yet complex actions that are interesting to retrieve.

The second finding is that for many verbs there is a clear optimum of the beta parameter: the performance graphs that show the MCC score across various values of beta show a peak. There are two categories of optimal beta values. One category of actions is best detected by beta=0, i.e. the original random forest. These actions are: arrive, bury, carry, catch, dig, enter, exit, fly, go, hit, jump, kick, lift, pass, putdown, run, snatch, turn. The other category of actions is characterized by an optimal intermediate value of beta. Notice the convex performance curves and peaks, most prominently observed for the actions: bounce, drop, get, give, hand, haul, have, move, open, pickup, push, replace, touch. For these actions, the optimization of the beta value of the soft-assignment random forest is critical.

The third finding is that small amounts of uncertainty, i.e. small values of beta<0.25, are structurally better than larger values (beta>0.25).

The fourth finding is that the average improvement across the board is 10%, from an average MCC=0.219 for the action detectors based on the original random forest, to MCC=0.241 with inclusion of the proposed soft-assignment.

CONCLUSIONS

This paper has addressed the improvement of the bag-of-features model for action recognition. We have generalized the random forest by substituting the binary decisions at the tree nodes by a sigmoid function. This sigmoid enables the modeling of uncertainty, which is intrinsic to making decisions on continuous feature values. Our soft-assignment random forest generalizes the original random forest to cope with uncertainty and continuous features. We have presented a simple and efficient implementation of the soft-assignment. In our experiments, we evaluate the detection of 48 human actions in 3,480 realistic movies. These movies are challenging as the actions vary highly in complexity and prevalence, ranging from a walking person (simple and high prevalence) to two persons who exchange an item with each other (complex and rare). Moreover, the scenes, recording conditions, viewpoints (yet static cameras), persons and their clothing also varies. We have demonstrated that the human actions that are hard to detect—because they involve interactions with or manipulations of some (typically small) item—are structurally improved. The average improvement across the board is 10%. Most prominent improvements are reported for a person handing, throwing, dropping, hauling, taking, closing or opening some item.

REFERENCES

A. Agarwal, B. Triggs, "Multilevel image coding with hyperfeatures," International Journal on Computer Vision, 2008.

D. Batra, R. Sukthankar, T. Chen, "Learning class-specific affinities for image labelling," International Conference on Computer Vision and Pattern Recognition, 2008.

A. Bosch, A. Zisserman, X. Munoz, "Scene classification using a hybrid generative/discriminative approach," IEEE Transactions on Pattern Analysis and Machine Intelligence, 2008.

L. Breiman, "Random forests," Machine Learning, 2001.

G. J. Burghouts, K. Schutte, "Correlations between 48 human actions improve their performance," International Conference on Pattern Recognition, 2012.

G. J. Burghouts, K. Schutte, H. Bouma, R. J. M. den Hollander, "Selection of Negative Samples and Two-Stage Combination of Multiple Features for Action Detection in Thousands of Videos," Machine Vision and Applications, submitted, 2012.

C.-C. Chang, C.-J. Lin, "LIBSVM: a library for support vector machines," http://www.csie.ntu.edu.tw/~cjlin/libsvm, 2001.

S. Sadanand, J. J. Corso, "Action bank: A high-level representation of activity in video," International Conference on Computer Vision and Pattern Recognition, 2012.

J. C. van Gemert, C. J. Veenman, A. W. M. Smeulders, J. M. Geusebroek, "Visual Word Ambiguity," IEEE Transactions on Pattern Analysis and Machine Intelligence, 2011.

L. Gorelick, M. Blank, E. Shechtmanm, M. Irani, R. Basri, "Actions as Space-Time Shapes," IEEE Transactions on Pattern Analysis and Machine Intelligence, 2012.

T. Guha, R. K. Ward, "Learning Sparse Representations for Human Action Recognition," IEEE Transactions on Pattern Analysis and Machine Intelligence, 2012.

A. Gupta, P. Srinivasan, J. Shi, L. S. Davis, "Understanding Videos, Constructing Plots: Learning a Visually Grounded Storyline Model from Annotated Videos," International Conference on Computer Vision and Pattern Recognition, 2009.

P. Hanckmann, K. Schutte, G. J. Burghouts, "Automated Textual Descriptions for a Wide Range of Video Events with 48 Human Actions," International Workshop on Video Event Categorization, Tagging and Retrieval, 2012.

Y.-G. Jiang, C.-W. Ngo, J. Yang, "Towards optimal bag-of-features for object categorization and semantic video retrieval," International Conference on Image and Video Retrieval, 2007.

F. Julie, B. Triggs, "Creating efficient codebooks for visual recognition," International Conference on Computer Vision, 2005.

I. Laptev, "On Space-Time Interest Points," International Journal of Computer Vision, 2005.

I. Laptev, M. Marszalek, C. Schmid, B. Rozenfeld, "Learning Realistic Human Actions from Movies," International Conference on Computer Vision and Pattern Recognition, 2008.

S. Lazebnik, C. Schmid, and J. Ponce, "Beyond bags of features: Spatial pyramid matching for recognizing natural scene categories," International Conference on Computer Vision and Pattern Recognition, 2006.

J. Liu, J. Luo, M. Shah, "Recognizing Realistic Actions from Videos 'in the Wild'," International Conference on Computer Vision and Pattern Recognition, 2009.

F. Moosmann, B. Triggs, F. Jurie, "Randomized Clustering Forests for Building Fast and Discriminative Visual Vocabularies," Neural Information Processing Systems, 2006.

F. Perronnin, "Universal and adapted vocabularies for generic visual categorization," IEEE Transactions on Pattern Analysis and Machine Intelligence, 2008.

J. Philbin, O. Chum, M. Isard, J. Sivic, A. Zisserman, "Lost in quantization: Improving particular object retrieval in large scale image databases," International Conference on Computer Vision and Pattern Recognition, 2008.

K. E. A. van de Sande, T. Gevers, C. G. M. Snoek, "Evaluating Color Descriptors for Object and Scene Recognition," IEEE Transactions on Pattern Analysis and Machine Intelligence, 2010.

C. Schuldt, I. Laptev, B. Caputo, "Recognizing Human Actions: A Local SVM Approach," International Conference on Pattern Recognition, 2004.

B. Silverman, P. Green, "Density Estimation for Statistics and Data Analysis," London, Chapmann and Hall, 1986.

J. Sivic, A. Zisserman, "Video Google: A Text Retrieval Approach to Object Matching in Videos," International Conference on Computer Vision, 2003.

T. Tuytelaars, C. Schmid, "Vector quantizing feature space with a regular lattice," International Conference on Computer Vision, 2007.

visint.org, development kit of the recognition task, 2011.

H. Wang, M. M. Ullah, A. Kläser, I. Laptev, C. Schmid, "Evaluation of local spatio-temporal features for action recognition," British Machine Vision Conference, 2009.

J. Zhang, M. Marszalek, S. Lazebnik, C. Schmid, "Local features and kernels for classification of texture and object categories: A comprehensive study," International Journal of Computer Vision, 2007.

The invention claimed is:

1. An image pattern recognition system for detecting a pattern from at least one image based on detected interest points in the at least one image, the pattern recognition system comprising:
one or more processors;
stored instructions that, when executed, cause the one or more processors to perform operations including:
extracting feature vectors, each feature vector comprising data derived from video content in a region in a predetermined relation to a location of a respective detected interest point in the at least one image;
computing a set of bin values for bins associated with leaf nodes of decision trees of a forest of decision trees, the bin value being computed for each bin by summing contributions corresponding to the feature vectors, each contribution being computed dependent on selections of feature vector components and thresholds associated with non-leaf nodes along a path through the decision tree to the leaf node associated with the bin;
computing a pattern detection result by comparing the set of bin values to reference sets of values,
wherein at least a first non-leaf node from the non-leaf nodes of the decision trees has an associated first scale value and at least a second non-leaf node from the non-leaf nodes of the decision trees has an associated second scale value, the computing of the set of bin values using a soft decision function in the computation of the contributions for the bins associated with leaf nodes at ends of paths through the decision tree that include the first non leaf node, the contributions being computed in proportion to a result of applying the soft decision function to a ratio of the first scale value and a difference between the threshold and a feature value taken from the feature vector according to the selection of the feature vector component associated with the first non-leaf node, the second scale value being used in the computation of the contributions for the bins associated with leaf nodes at ends of paths through the decision tree that include the second non leaf node, the operations performed by the one or more processors further including:
computing the first and second scale value by determining a first and second measure of statistical spread of the feature values taken from the feature vectors of a training set according to the selection of the feature vector component associated with the first and second non-leaf node respectively, and setting the first and second scale value to a product of a common factor and the first and second measure of statistical spread respectively.

2. An image pattern recognition system according to claim 1, wherein the interest points are spatio-temporal interest points having space and time coordinates in a temporal sequence of images, the feature vectors each being from a respective spatio-temporal region in the sequence of images, in a predetermined spatio-temporal relation to a spatio-temporal location of a respective detected interest point.

3. An image pattern recognition system according to claim 1, wherein substantially all of the non-leaf node of the decision trees have a respective scale value for use in the computation of the contributions for the bins associated with leaf nodes at ends of paths through the decision tree that include the second non leaf node, the contributions being computed in proportion to results of applying, for each of the substantially all of the non-leaf nodes, a respective soft decision function to a ratio of the respective scale value for the non-leaf node and a difference between respective threshold and a feature value taken from the feature vector according to the selection of the feature vector component associated with the non-leaf node; the operations performed by the one or more processors further including computing the respective scale values by determining respective measures of a statistical spread of the feature values taken from the feature vectors of a training set according to the selection of the feature vector component associated with said substantially all non-leaf nodes respectively, and setting the respective scale value for each of said substantially all non-leaf nodes to a product of a common factor and the measure of the statistical spread for the non-leaf node.

4. An image pattern recognition system according to claim 3, wherein the operations performed by the one or more processors further include selecting the common factor in a feedback loop using the pattern detection results obtained for training examples, using respective different values of the common factor.

5. An image pattern recognition system according to claim 3, wherein the operations performed by the one or more processors further include selecting the common factor independently for respective different pattern classes on the basis of training examples for the respective different pattern classes.

6. An image pattern recognition system according to claim 3, wherein the measure of statistical spread is a standard deviation of the feature values taken from the feature vectors of a training set according to the selection of the feature vector component associated with the non-leaf node.

7. An image pattern recognition method for detecting a pattern in at least one image from detected interest points in the at least one image, the method comprising
extracting feature vectors, each feature vector comprising data derived from video content in a region in a predetermined relation to a location of a respective detected interest point in the at least one image;
computing a set of bin values for bins associated with leaf nodes of decision trees of a forest of decision trees, the bin value being computed for each bin by summing contributions corresponding to the feature vectors, each contribution being computed dependent on selections of feature vector component and thresholds associated with non-leaf nodes along a path through the decision tree to the leaf node associated with the bin;

wherein at least a first non-leaf node from the non-leaf nodes of the decision trees has an associated first scale value, and at least a second non-leaf node from the non-leaf nodes of the decision trees has an associated second scale, a soft decision function being used in the computation of the contributions for the bins associated with leaf nodes at ends of paths through the decision tree that include the first non leaf node, the contributions being computed in proportion to a result of applying the soft decision function to a ratio of the first scale value and a difference between the threshold and a feature value taken from the feature vector according to the selection of the feature vector component associated with the first non-leaf node, the second scale value being used in the computation of the contributions for the bins associated with leaf nodes at ends of paths through the decision tree that include the second non leaf node;

computing a pattern detection result by comparing the set of bin values to reference sets of values, the method comprising computing the first and second scale value by determining a first and second measure of statistical spread of the feature values taken from the feature vectors of a training set according to the selection of the feature vector component associated with the first and second non-leaf node respectively, and setting the first and second scale value to a product of a common factor and the first and second measure of statistical spread respectively.

8. A method according to claim 7, wherein the interest points are spatio-temporal interest points having space and time coordinates in a temporal sequence of images, the feature vectors being extracted each from a respective spatio-temporal region in the sequence of images, in a predetermined spatio-temporal relation to a spatio-temporal location of a respective detected interest point.

9. A method according to claim 7, wherein substantially all of the non-leaf node of the decision trees have a respective scale value for use in the computation of the contributions for the bins associated with leaf nodes at ends of paths through the decision tree that include the second non leaf node, the contributions being computed in proportion to results of applying, for each of the substantially all of the non-leaf nodes, a respective soft decision function to a ratio of the respective scale value for the non-leaf node and a difference between respective threshold and a feature value taken from the feature vector according to the selection of the feature vector component associated with the non-leaf node; the method comprising determining respective measures of statistical spread of the feature values taken from the feature vectors of a training set according to the selection of the feature vector component associated with said substantially all non-leaf nodes respectively, and setting the respective scale value for each of said substantially all non-leaf nodes to a product of a common factor and the measures of statistical spread for the non-leaf node.

10. A method according to claim 7, comprising selecting the common factor in a feedback loop using the pattern detection results obtained for training examples, using respective different values of the common factor.

11. A method according to claim 7, wherein respective sets of the scale values are selected each for a respective class of detectable patterns, for use to detect occurrences of patterns from the respective classes, wherein the common factor is selected independently for different classes.

12. A method according to claim 1, wherein the measure of statistical spread is a standard deviation of the feature values taken from the feature vectors of a training set according to the selection of the feature vector component associated with the non-leaf node.

13. A non-transitory computer readable storage medium, comprising a program of instructions embodied thereon for causing a programmable processing system to execute the method of claim 7.

* * * * *